(12) United States Patent
Waltz et al.

(10) Patent No.: US 7,124,799 B2
(45) Date of Patent: Oct. 24, 2006

(54) LAMINATION APPARATUS AND METHOD OF USE

(75) Inventors: Ellen Waltz, Deerfield, IL (US); Larry Waltz, Deerfield, IL (US)

(73) Assignee: Picture Rich LLC, Deerfield, IL (US)

( * ) Notice: Subject to any disclaimer, the term of this patent is extended or adjusted under 35 U.S.C. 154(b) by 113 days.

(21) Appl. No.: 10/898,928

(22) Filed: Jul. 27, 2004

(65) Prior Publication Data
US 2006/0021709 A1 Feb. 2, 2006

(51) Int. Cl.
*B29C 65/02* (2006.01)
*B32B 39/00* (2006.01)
*B32B 37/18* (2006.01)

(52) U.S. Cl. .................. 156/538; 156/539; 156/556

(58) Field of Classification Search ........ 156/555–571, 156/538, 539
See application file for complete search history.

(56) References Cited

U.S. PATENT DOCUMENTS

| | | | |
|---|---|---|---|
| 3,027,285 A | 3/1962 | Eisner et al. | |
| 3,642,552 A | 2/1972 | Sibley | |
| 3,865,668 A | 2/1975 | Holson | |
| 4,019,943 A | 4/1977 | Holson | |
| 4,140,565 A | 2/1979 | Parker et al. | |
| 4,244,762 A | 1/1981 | Holson | |
| 4,252,598 A * | 2/1981 | Bachelder | 156/556 |
| 4,493,743 A * | 1/1985 | Lunding | 156/555 |
| 4,505,772 A * | 3/1985 | Renz | 156/355 |
| 4,595,931 A * | 6/1986 | Toganoh et al. | 400/120.18 |
| 4,900,173 A * | 2/1990 | Okamura | 400/606 |
| 5,266,150 A | 11/1993 | Miller | |
| 5,369,677 A * | 11/1994 | Rosengren | 376/340 |
| 5,445,700 A | 8/1995 | Uang | |
| 5,476,568 A | 12/1995 | Marion et al. | |
| 5,502,464 A * | 3/1996 | Takahashi et al. | 346/25 |
| 5,520,772 A | 5/1996 | Levitan et al. | |
| 5,944,936 A * | 8/1999 | Behn | 156/285 |
| 6,159,327 A | 12/2000 | Forkert | |
| 6,174,404 B1 * | 1/2001 | Klinger | 156/277 |
| 6,517,655 B1 | 2/2003 | Spencer et al. | |
| 6,660,119 B1 | 12/2003 | Allen et al. | |
| 6,761,677 B1 * | 7/2004 | Manico et al. | 493/424 |

OTHER PUBLICATIONS

International Search Report dated Jan. 13, 2006.

* cited by examiner

*Primary Examiner*—Chris Fiorilla
*Assistant Examiner*—Sing P. Chan
(74) *Attorney, Agent, or Firm*—McGuireWoods LLP

(57) ABSTRACT

A lamination apparatus and method of use, and more particularly a lamination apparatus for automatically laminating photographs onto album pages is provided. The lamination apparatus includes a holder slidably mountable on a main body and having an exit region in communication with an input region of the main body. A staging tray is arranged to be in a transportation path with the exit region of the holder and the input region of the main body. A guide is arranged downstream from a transportation path of the staging tray. A lamination tray is arranged to have an exit portion downstream from the downstream transportation path of the staging tray such that the a support media will be provided to the guide and combined with media from the lamination tray and the holder at the exit portion of the lamination tray.

28 Claims, 6 Drawing Sheets

LAMINATION APPARATUS AND METHOD OF USE

BACKGROUND OF THE INVENTION

1. Field of the Invention

The invention is directed to a lamination apparatus and method of use, and more particularly to a lamination apparatus for laminating photographs onto album pages.

2. Background Description

Photography is a hobby for millions of people worldwide. With the advent of digital photograph, photographs can be easily organized in digital format into folders on a computer hard drive, for example. Also, photo albums can easily be assembled using well known software packages. These photo albums can be organized such that photographs are assembled by date, person, or a host of other categories. These photographs can also be easily reorganized using these software packages.

However, many people still prefer to use conventional film and have printed photographs. Also, many people that use digital photography still print the pictures. In either case, these photographs are, in many instances, placed in a photo album using laminate paper. But, to organize these photographs in a photo album is a time consuming and arduous task. For example, it is necessary to first organize the photographs by category, for example, then have a "mock" layout prior to placing them in the photo album.

To assist in the process of placing photographs into a photo album, many devices have been devised over the years, ranging from smaller to larger machines. For example, in smaller machines heating of a plastic film to aid in lamination is accomplished by flat platens. Once heated, expeller rollers downstream of the platens compress the heated film. An early example of a flat platen laminator is U.S. Pat. No. 2,927,620. The other basic type of laminating machine is the larger machine. In these machines, heated rollers are used in the lamination process. An example of the larger machines is shown in U.S. Pat. No. 3,027,285.

However, these apparatuses have a number of disadvantages. For example, these machines do not automatically facilitate the layout of photographs onto paper media (e.g., photo album pages). As a result, creating a photo album requires the consumer to manually insert individual photographs onto a media page, or into a plastic page compartment or other type of storage device. For example, some systems require the photographs to be adhered onto a media page with adhesive "dots"; that is, each corner of the photograph is attached to a media page with dots prior to applying a protective covering (e.g., laminate). Accordingly, due to complexity of the processes and/or lack of automation, uncompleted photo album pages are typically placed into the album or binder, which results in the accumulation and storage of numerous photographs that the consumer, due to time constraints, has not had the time to organize.

SUMMARY OF THE INVENTION

In a first aspect of the invention, a laminating device includes a holder mountable on a main body and having an exit region in communication with an input region of the main body. A staging tray is arranged to be in a flow path with the exit region of the holder and the input region of the main body and a guide is arranged downstream from a flow path of the staging tray. A media tray is arranged to provide media to the guide. A lamination tray is arranged to have an exit portion downstream from the downstream transport path of the staging tray such that the a support media will be provided to the guide and combined with media from the lamination tray and the holder at the exit portion of the lamination tray.

In another aspect of the invention, the laminating device includes a main body and a holder arranged on the main body. The holder has an exit region in communication with an input region of the main body. An actuating rail provides linear motion to the holder. A staging tray is arranged adjacent to the input region of the main body and the guide, and a media tray is arranged in communication with the guide upstream from the staging tray. A lamination tray having an exit portion adjacent the guide and downstream from the staging tray and the media tray is also provided.

In yet another aspect of the invention, the laminating device includes a holder slidably mounted onto a main body. The staging tray is arranged adjacent to the input region of the main body. The guide and a media tray are arranged in communication with the guide upstream from the staging tray. A lamination tray having an exit portion adjacent the guide and downstream from the staging tray and the media tray is also provided. At least one heater is positioned downstream the staging tray, the lamination tray and the media tray to provide heat to a laminate exiting from the lamination tray.

BRIEF DESCRIPTION OF THE DRAWINGS

FIG. 5A illustrates a front side unfolded view of a base substrate according to an embodiment of the invention; and FIG. 5B illustrates a rear side unfolded view of a base substrate according to an embodiment of the invention.

DETAILED DESCRIPTION OF EMBODIMENTS OF THE INVENTION

The invention provides an automated lamination apparatus which may be configured to process photographs onto a base substrate and covering the same with a protective cover. For example, in embodiments of the invention, the apparatus automatically mounts photographs onto a base substrate and laminates the same. This facilitates the organization and assembly of a photo album.

Figure 1:
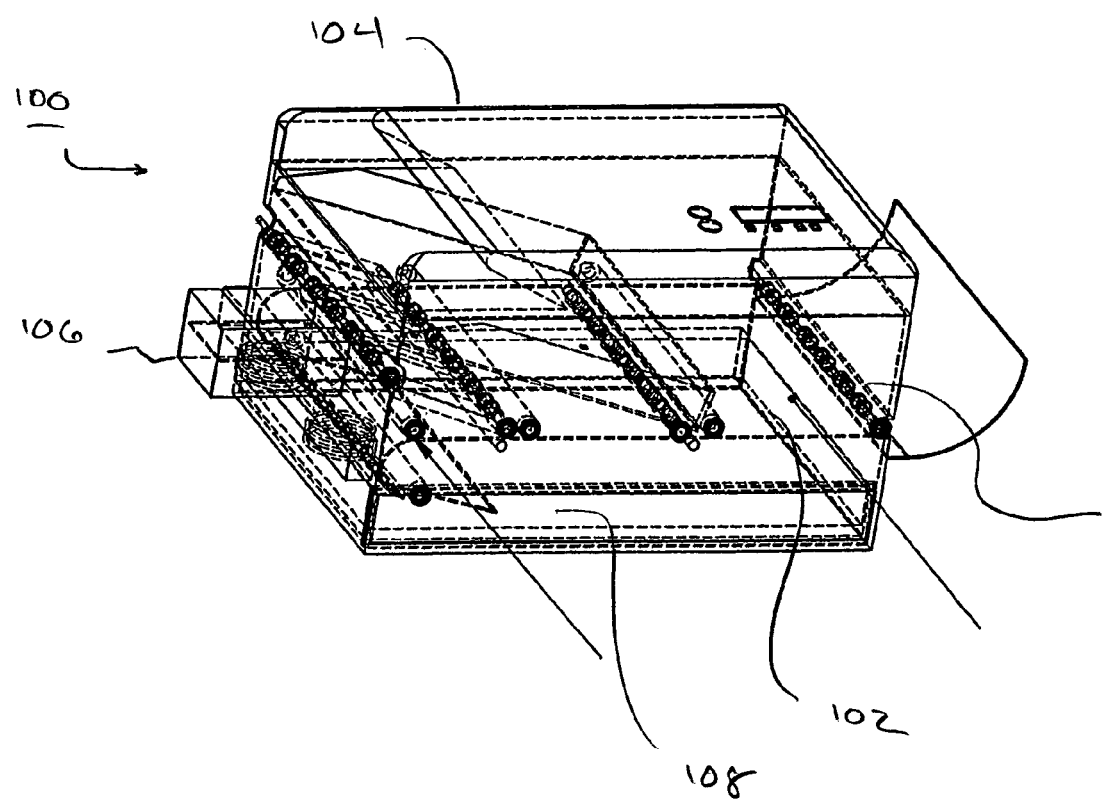
FIG. 1 illustrates a perspective view of a lamination apparatus according to an embodiment of the invention.
Figure 2:
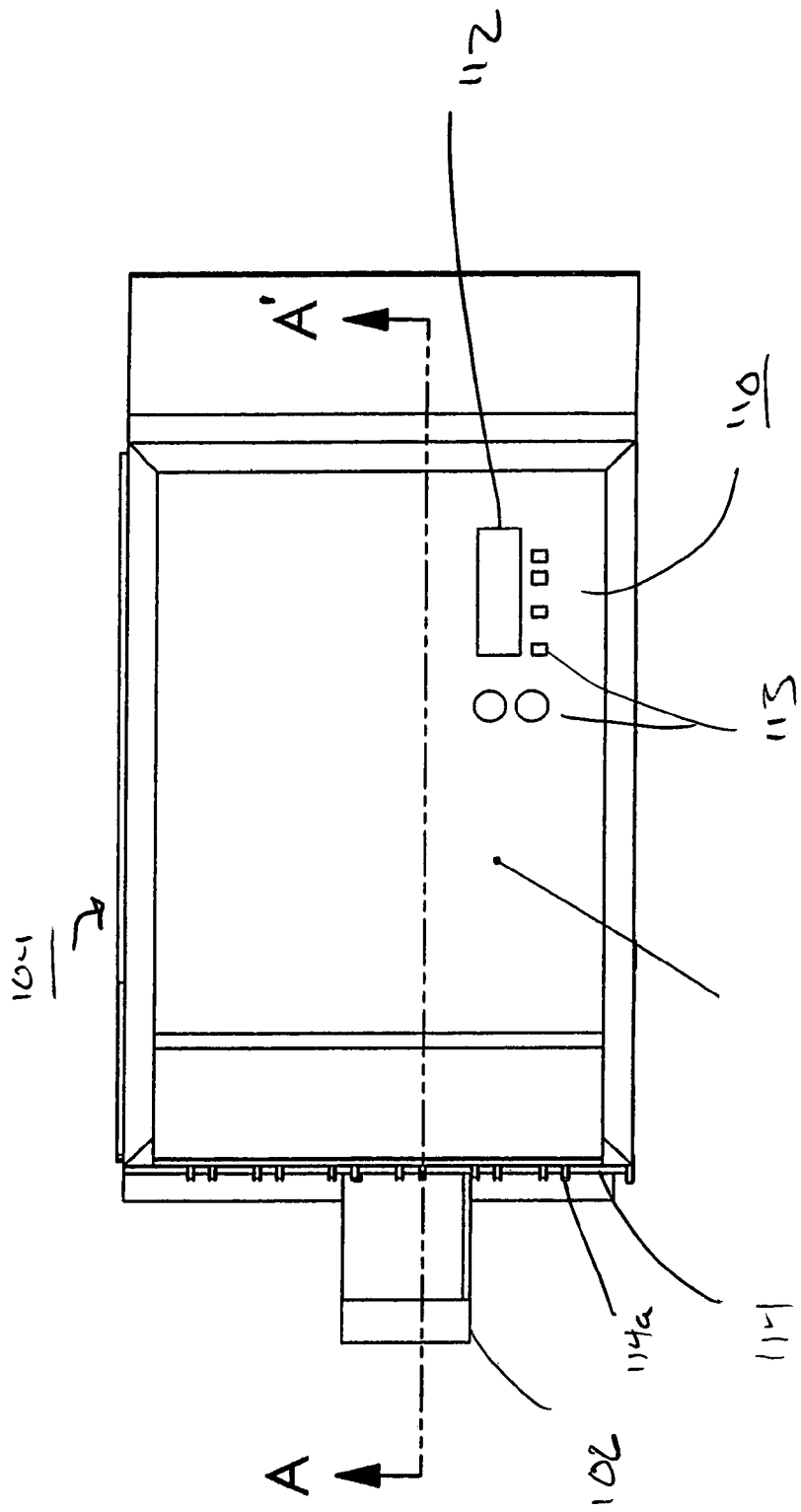
FIG. 2 illustrates a top view of the apparatus of FIG. 1 according to an embodiment of the invention.

FIG. 1 illustrates a perspective view of a lamination apparatus in accordance with the invention. The apparatus is generally depicted as reference numeral 100 and includes a main body 102 having a cover 104. The apparatus 100 further includes a holder 106 which, for example, is designed to hold photographs, cards, or other content media. A page or support media tray 108 is slidably positioned within the main body 102. The cover 104 is configured to open, thereby allowing access to the inner components of the apparatus 100. The holder 106 may be of any size configured to hold various sized photographs or other content media for processing in the apparatus. For example, the holder 106 may have an adjustable mechanism to accommodate various sized pictures. The main body 102 as well as other components such as, for example, the cover 104 may be formed from any combination of material. For example, the components of the apparatus may comprise plastic, fabricated metal, composite materials and/or the like. Referring now to FIG. 2, the cover 104 includes a control panel 110 that is configured to display the operational status of the apparatus 100. More specifically, the control panel 110 may be configured to receive signals from a plurality of sensors arranged at various locations in the apparatus 100, as discussed in more detail below. In operation, it allows an operator to determine the number of photographs, for example, in the holder 106, the number of support media (e.g., album pages) in the tray 108, the number of covering media, such as laminates, in a laminate tray and the like. Additionally, the panel 110 may be configured to provide instructions for operating the apparatus 100 (e.g., directions on completion), safety information, trouble shooting information, and/or the like.

The control panel 110 may be arranged at various locations on the apparatus 100 or it may be arranged to be external to the apparatus 100. In this embodiment, the control panel 110 includes a display 112 and operational inputs 113. The display 112 may be any type of suitable display, for example, digital display, plasma panel display, liquid crystal display, light emitting diode display, organic light emitting diode display, and the like.

Still referring to FIG. 2, the holder 106 may be arranged below the cover 104, for example, along a side portion of the apparatus 100; however, other positions are also possible in accordance with the invention. The holder 106 may move in a linear direction in order to distribute photographs, for example, into desired locations on a staging tray (shown in FIG. 3 as reference numeral 122). A feed shaft 114 including a plurality of rollers 114a is arranged adjacent to the holder 106 in order to feed the photographs onto the staging tray 122 in the apparatus 100.

Figure 3:
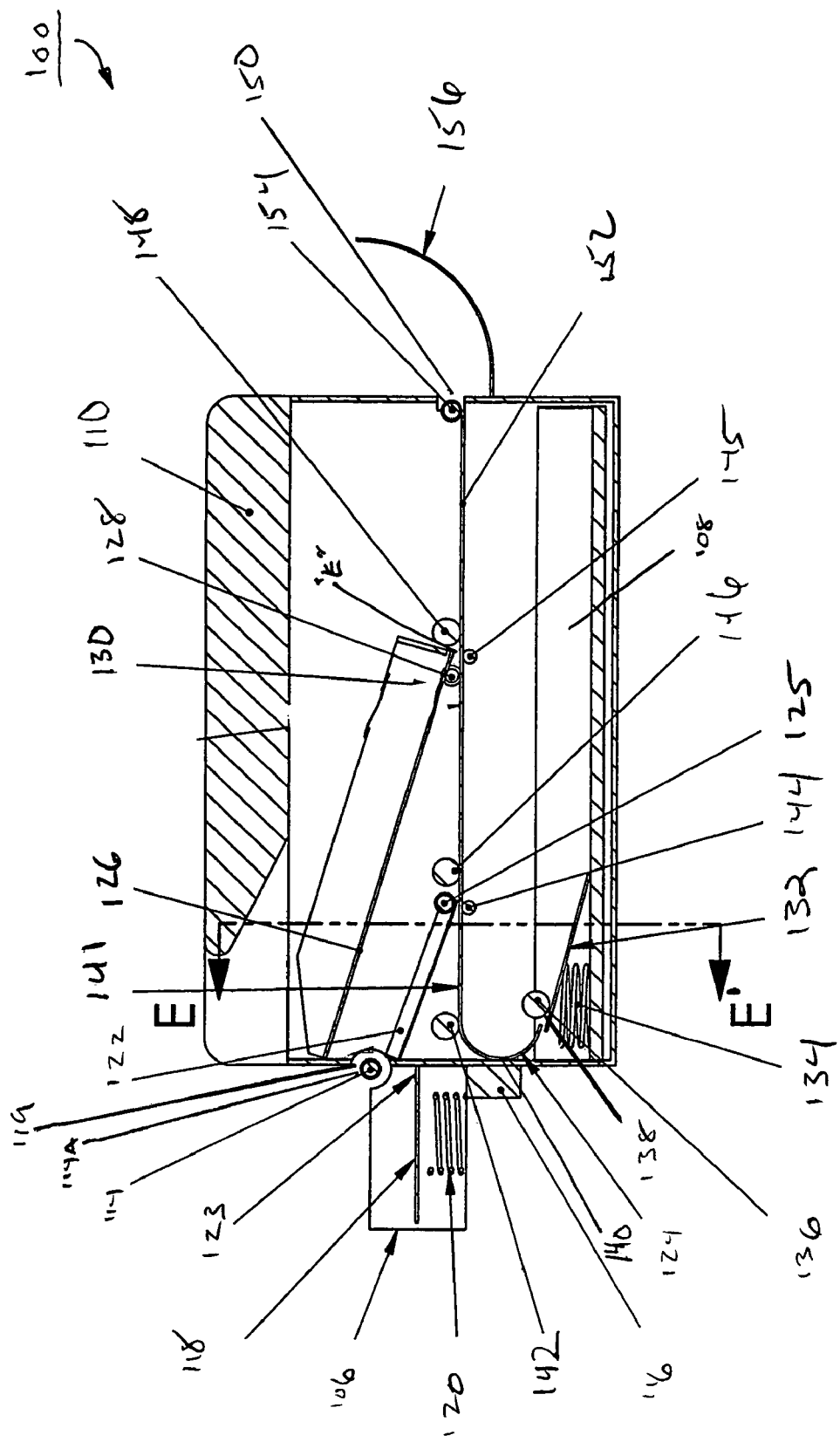
FIG. 3 illustrates a cross sectional view of FIG. 2 taken along line A–A' according to an embodiment of the invention.

Referring now to FIG. 3, the holder 106 is arranged on an actuating rail 116, which provides the linear motion to the holder 106. In this manner, the holder 106 can move between a first position and a second position which is used to facilitate positioning of photographs to desired locations on the staging tray 122. Any suitable mechanism may be used for facilitating the movement of the holder 106, for example, actuating rails that utilize lead screws, magnetic positioning mechanisms, linear scales, linear encoders, and/ or rotary encoders. The photographs may be aligned into input region 119 and in contact with the feed shaft 114 and rollers 114a.

Inside the holder 106 is an adjustable pressure plate 118. Using the pressure plate 118, photographs placed on the adjustable pressure plate 118 are provided with an upward force allowing the photographs to be fed into the apparatus 100. In operation, the pressure plate 118 allows the photographs to be positioned in communication with the rollers 114a and feed shaft 114. In this embodiment, a spring 120 is arranged under the plate 118 to push the photographs in an upward direction. The spring may be a single mechanism or a series of mechanisms including coil springs, stampings, leaf springs, and/or the like. These mechanism(s) may be formed from any suitable material or combination of materials, for example, plastic, metal, spring, steel, composite material and the like. Of course, other suitable mechanism may be utilized to exert a pressure on the substrates.

In this embodiment, the feed shaft 114 is arranged above the input region 119 and is rotatable about its axis. The feed shaft 114 may include a plurality of rollers 114a and may be driven by any suitable means, for example, a manual cranking mechanism, motor, and the like. In this configuration, an electric motor (not shown) drives the feed shaft 114. The feed shaft 114 may be manufactured from a number of different materials, for example, metal bar stock, extruded plastic, extruded aluminum, a molded composite, plastic, rubber, and/or the like. Optionally, coatings may be applied to the rollers 114a to provide the necessary friction to move substrates from the holder 106 to the staging tray 122. The staging tray 122 is configured to locate single or multiple photographs into a predetermined position prior to arrangement onto the base substrate.

Still referring to FIG. 3, the staging tray 122 has one end positioned near the input region 119 and another end arranged on or near a guide 124. The end arranged on or near the guide 124 is adjacent to a feed shaft 125, similar to the feed shaft 114. For example, the feed shaft 125 may include a plurality of rollers and may be driven by any suitable means, for example, a manual cranking mechanism, motor, and the like. In this configuration, an electric motor (not shown) drives the feed shaft 125. In operation, substrates may be automatically arranged on the staging tray 122 in preparation for mounting onto a base substrate via the feed shaft 125.

In this embodiment, a lamination tray 126 is arranged above the staging tray 122, where an end of the lamination tray 126 is positioned on or near the guide 124, downstream from the staging tray. The lamination tray 126 is a compartment where lamination sheets are held in preparation for transfer onto a base substrate with photographs, for example, arranged thereon. A feed shaft 128 is mounted to or near the end of the lamination tray 126, adjacent a surface of the guide 124. Additionally, a drive shaft 148 is arranged to feed laminates onto the guide 124, and may include a plurality of rollers driven by any suitable means, for example, a manual cranking mechanism, motor, and the like. In this configuration, an electric motor (not shown) drives the drive shaft 148.

A sensor 123 may be configured to determine whether the holder 106 is empty or full. Also, the sensor 123 can be configured to determine other information, for example, the number of substrates, the orientation of substrates, or the orientation of the substrate holder 106 for processing substrates onto a staging tray 122. This sensor may be, for example, a photo-diode, a shaft encoder a pneumatic, optical, pressure or magnet sensor all known in the art and capable of provided the required information. A sensor 130 is also arranged on or near the lamination tray 126 to determine whether the lamination tray is empty. The sensor 130 may be configured to provide other information similar to the sensor 123. Much like the sensor 123, this sensor may be, for example, a photo-diode, a shaft encoder a pneumatic, optical, pressure or magnet sensor all known in the art and capable of provided the required information.

The media tray 108 is arranged below the guide 124 and adapted to receive various media. More specifically, the media tray 108 may receive base substrates, photo album pages, and other support media to mount the photographs thereon. A pressure plate 132 is arranged inside the media tray 108 and is configured to align the base substrates with a drive shaft 136 and input region 138 onto the guide 124 (e.g., page support guide). In this configuration, the drive shaft 136 is arranged above the input region 138 and is rotatable about its axis. The drive shaft 136 may include a plurality of rollers and may be driven by any suitable means, for example, a manual cranking mechanism, motor, and the like. In this configuration, an electric motor (not shown) drives the drive shaft 136. An upward force is provided onto a pressure plate 132 by a spring 134, whereby the base substrates may be aligned under the drive shaft 136. However, other suitable means may be utilized to exert pressure on the substrates, for example, by a similar means as described above with respect to spring 120 and the like.

Still referring to FIG. 3, a displacement region 140 is provided between the guide 124 and an inside wall of the apparatus 100 in order to allow the base substrates to be transported by the drive shaft 136 to drive shaft 142. Of course, other suitable configurations are also possible. Drive shaft 142 is similar to drive shaft 136 and may be driven by similar means. A sensor 141 is arranged on or near the guide 124 to determine the location of the base substrate and/or provide other information. This sensor may be, for example, a photo-diode, a shaft encoder a pneumatic, optical, pressure or magnet sensor all known in the art and capable of provided the required information.

A first heater 144 is arranged adjacent to the guide 124 and the staging tray 122 to activate a thermal sensitive coating on the base substrate. A second heater 145 is arranged adjacent to an exit portion of the lamination tray 126 and heats the base substrates prior to the application of laminate.

A drive shaft 146 is configured to transport the base substrate and photograph along the guide 124 to an exit portion "E" of the lamination tray 126. The drive shaft 146 is similar to drive shaft 142 and may be driven by similar means. A drive shaft 148 is also arranged adjacent to an end portion of the laminate tray 126 to transport the laminated base substrate and photograph to an exit portion 150 of the apparatus. The drive shaft 148 is similar to drive shaft 146 and may be driven by similar means.

A sensor 152 is configured to recognize the location of the material being transported along the guide to the exit portion 150 and exit tray 156 via a feed shaft 154. This sensor may be, for example, a photo-diode, a shaft encoder a pneumatic, optical, pressure or magnet sensor all known in the art and capable of provided the required information. Feed shaft 154 is similar to feed shaft 114 and may be driven by similar means. The exit tray 156 is configured to receive the finished product.

Figure 4:
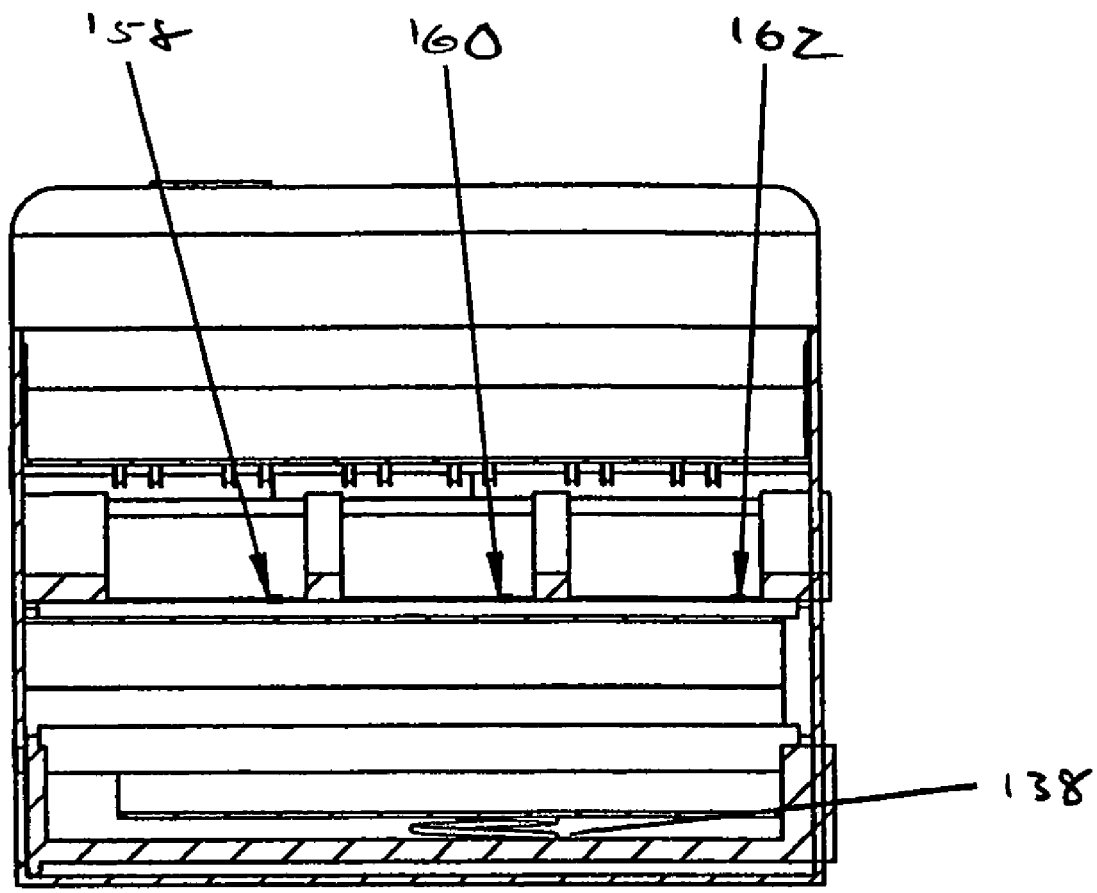
FIG. 4 illustrates a cross sectional view of FIG. 3 taken along line E–E' according to an embodiment of the invention.
Figure 6A:
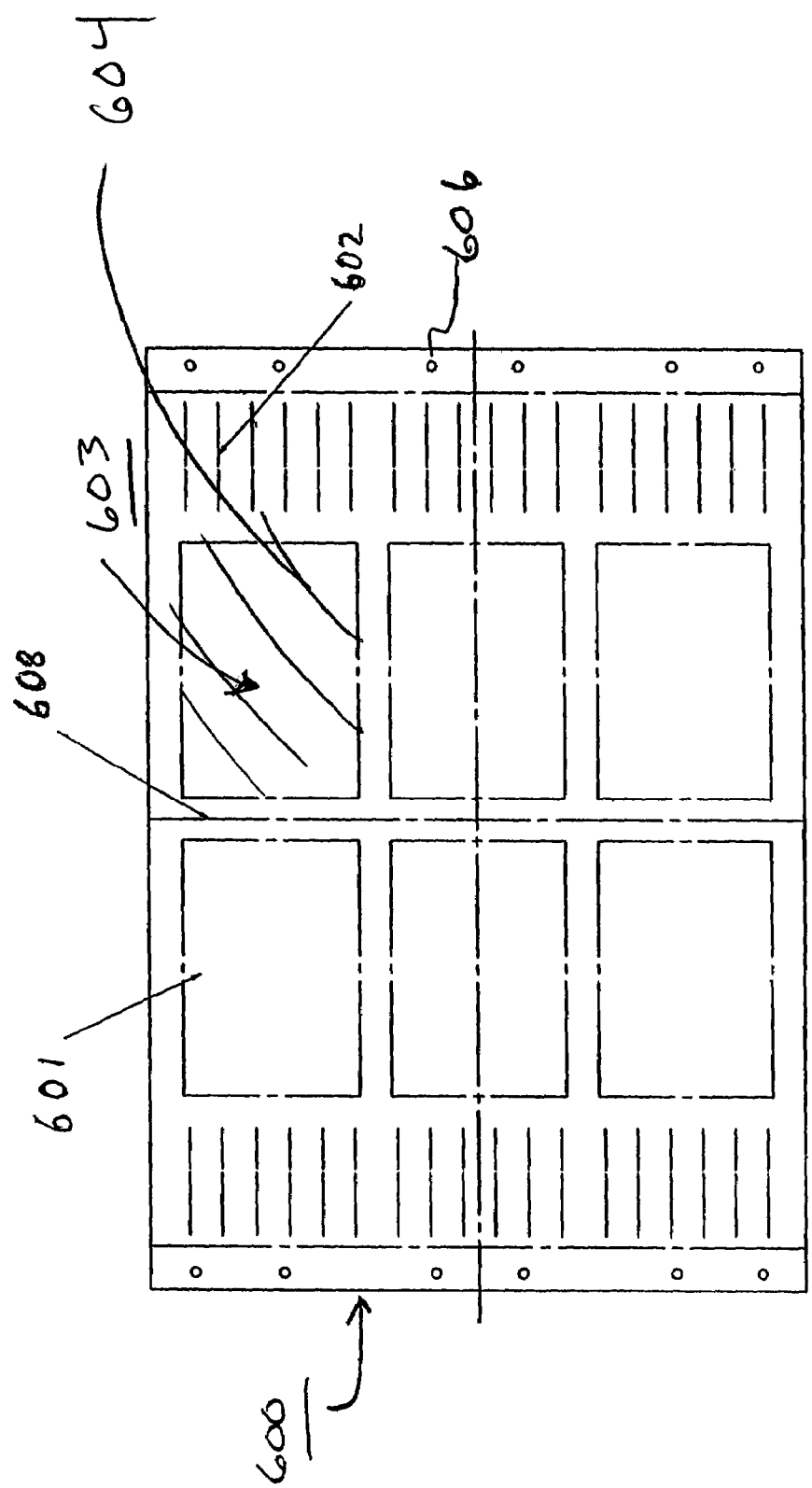
Figure 6B:
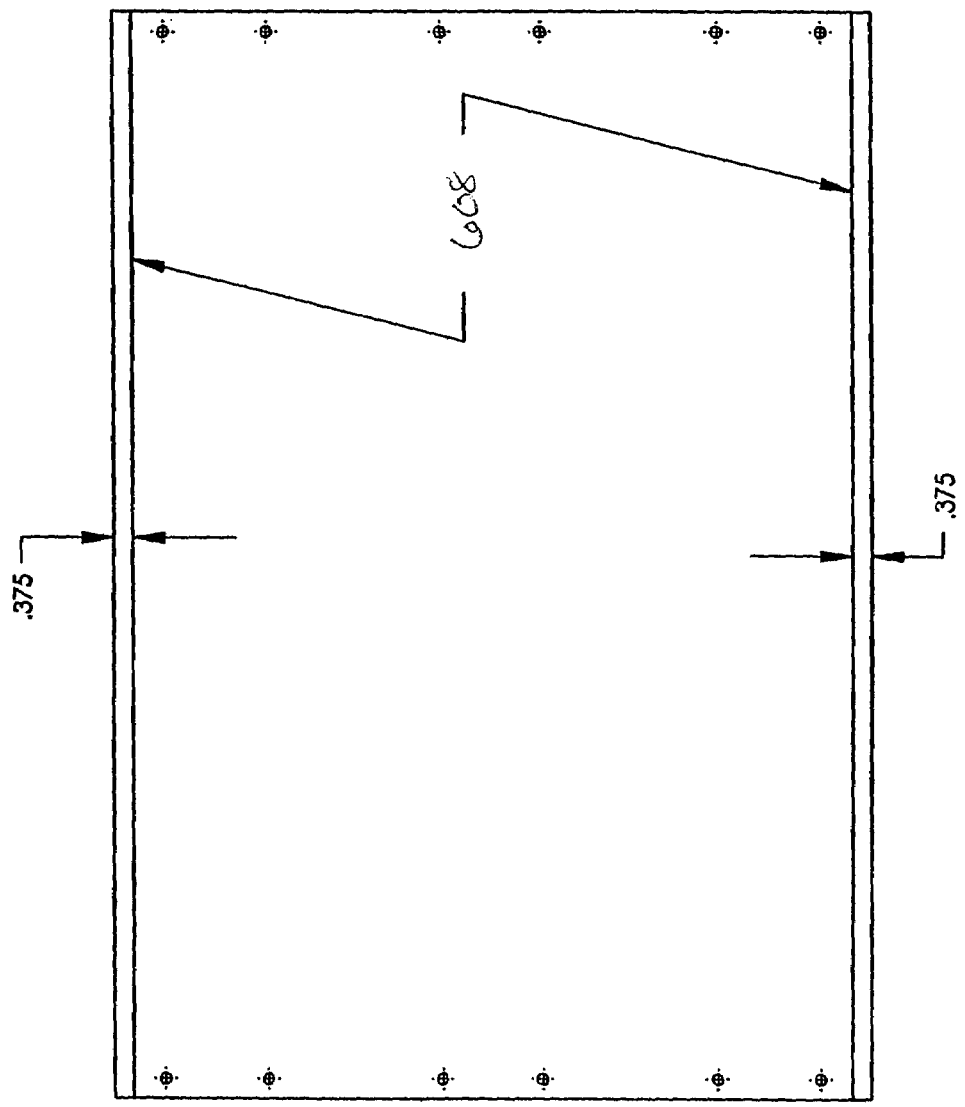

FIG. 4 illustrates a cross sectional view of FIG. 3 taken along line E–E'. Referring to FIG. 4, a plurality of sensors, for example, sensors 158, 160, and 162, are arranged at various locations throughout the apparatus 100. In this configuration, the sensors are configured, for example, to determine the location of substrates in the substrate holder, base substrate in the media tray, laminates in the lamination tray, various staging positions of the substrates, base substrates, and the like. The sensors are configured to be in electrical communication with the control panel 110. Additionally, the sensors used in the invention may be pneumatic, optical, pressure, magnet, and/or the like, as discussed in detail above.

FIG. 5A illustrates a frontal view of a base substrate 600 according to an embodiment of the invention. More specifically, the base substrate 600 is designed for use in the apparatus 100. Referring to FIG. 5A, the base substrate 600 in this embodiment is an album page. Description lines 602 are used for descriptions of photographs mounted on the album page and are positioned adjacent to the substrate location 603. In this embodiment, photographs may be placed on thermal adhesion sections 604. Of course, the adhesion sections need not be thermally activated and may be any type of adhesion region, for example, peel adhesive. Regions of the album page 600 may include holes 606 to be utilized with a binder. Other type of securing mechanisms may also be utilized. A folding line 608 (e.g., pre-creased) may be positioned in the middle of the album page 600 to facilitate folding.

FIG. 5B illustrates the reverse side of FIG. 5A. Referring to FIG. 5B, an adhesive strip is 608 is arranged along edges of the photo album. Any suitable size of the strip of the may be utilized for example 0.375 inches. Additionally, other orientations and configurations of the adhesion strip are possible.

Operation of Use

Referring again to FIG. 1, operation of the apparatus 100 used to arrange photographs, for example, onto base substrates with a protective covering will now be described. It should be recognized that the invention is not limited to placing photographs onto the base substrates, but may include cards, certificates, and/or other items to be arranged on the base substrate. The base substrate may be media, cardboard, album pages, and/or the like. The cover may be a laminate, plastic cover, and the like. In this embodiment, the application of photographs onto an album pages and lamination, thereof, will be described.

The process begins by pressing an operation button 113 on the control panel 110. A sensor recognizes that there are photographs in the holder 106 and an electrical signal prompts the feed shaft 114 to feed the photographs from the holder 106, downstream, onto the staging tray 122. Also, a sensor is configured to determine whether there are album pages in the tray 108. This sensor may be operated simultaneously with the sensor in the substrate holder 106. Additionally, a sensor in the lamination tray 126 is utilized to determine whether laminates are available. It should be understood that these sensors may be configured together to determine whether the photographs, album pages, and lamination sheet are in their proper locations prior to activating the drive shaft to feed the album page along the guide 124 through drive shaft 142 and heater 144.

As the album page passes through the first heater, photographs may be fed from the staging tray 122 by a feed shaft 125 and pressed onto the album page by drive shaft 146. These photographs are held in place by a thermally activated adhesion via the heater 144. Subsequently, the drive shaft 146 moves the incomplete unit across the guide 124 to another heater 145, where a sensor is configured to determine the location of the incomplete unit. At this point, the partially completed unit is again sent through the heater to activate thermally sensitive coating in preparation of the lamination sheet.

As the partially completed unit is being sent through the heater 145, additional photographs may be input from the substrate holder 106 and applied to another potion of the album page by a pressure roller (not shown). These photographs are adhered to the photo album page by activating the thermally sensitive adhesive. After these photographs have been applied onto the album page, the drive shaft 148 is activated where the laminate is applied.

After all of the substrates have been covered, a sensor 152 is configured to drive a feed shaft 154 to move the completed unit to the exit tray 156. Next, the album page may be folded along the pre-creased line forming a single double sided album page. Plastic strips covering lines of adhesive on the inside of the album page may be removed allowing the inner surfaces of the album page to adhere to one another creating a finished album page. The descriptive space may be filled in with a written description and the page may be mounted in the album.

While the invention has been described in terms of preferred embodiments, those skilled in the art will recognize that the invention can be practiced with modification within the spirit and scope of the appended claims.

What is claimed:

1. A laminating device, comprising:
   a main body having an input region and an exit region;
   a holder to provide at least one content media mountable on the main body, the holder having a holder exit region in communication with the input region of the main body to permit media content to leave the holder and enter the main body;
   a support media tray to provide at least one support media;
   a guide arrange in the flow path from a support media tray exit port to the exit region, wherein the guide assists in guiding the support media from the support media tray to the exit region along the flow path;
   a staging tray arranged at the input region of the main body and having a staging exit region, the staging tray receiving the content media and creating a path for the content media from the input region to a location on the guide downstream from the support media tray exit port, whereby at least one content media from the staging tray is combine with a support media; and
   a lamination tray to provide at least one covering media and having a lamination exit portion, the lamination tray arranged such that the lamination exit portion is at a location on the guide and downstream from the staging exit region of the staging tray whereby a covering media is laminated to the combined at least one content media and the support media; and
   wherein the lamination combined at least one content media, covering media, and support media is transported to the exit region of the main body.

2. The lamination device of claim 1, further comprising an exit tray downstream of the exit portion of the lamination tray.

3. The laminating device of claim 1, further comprising an actuating rail to provide linear motion to the holder.

4. The laminating device of claim 1, wherein the holder comprises a pressure plate arranged inside the holder to align content media with a feed shaft arranged near the input region of the main body, the feed shaft feeding the content media to the staging tray.

5. The laminating device of claim 4, wherein the pressure plate is arranged on a spring to provide an upward force to the content media.

6. The laminating device of claim 1, further comprising a first heater arranged near or on the guide and the exit region of the staging tray to activate a heating substance in the support media.

7. The laminating device of claim 6, further comprising a second heater arranged on or near the guide adjacent the exit portion of the lamination tray to activate heat activated laminate.

8. The photograph laminating device of claim 1, further comprising at least one sensor configured to determine at least one of whether (i) content media is in the staging tray, (ii) covering media is in the lamination tray and (iii) support media is on the guide.

9. The laminating device of claim 8, wherein the least one sensor is at least three sensors each adjacent near the staging tray, the lamination tray and the guide, respectively.

10. The laminating device of claim 1, wherein content media in the holder are one or more photograph, the media in the lamination tray are laminate sheets and the support media is an album page.

11. The laminating device of claim 1, further comprising a control panel for at least monitoring at least one of position and availability of the content media and support media.

12. The laminating device of claim 1, further comprising:
   feeding mechanisms adjacent the input and output region of the staging tray, adjacent the lamination tray and the guide; and
   a pressing unit for pressing together content media exiting from the staging tray and support media exiting from media tray prior to the output portion of the lamination tray.

13. The laminating device of claim 12, wherein the pressing unit includes a pressing unit positioned at an exit of the lamination tray for pressing together content media exiting from the staging tray and support media exiting from media tray and covering media exiting from the lamination tray.

14. A laminating device, comprising:
   a main body;
   a holder arranged on the main body, the holder having an exit region in communication with an input region of the main body,
   an actuating rail to provide linear motion to the holder;
   a guide;
   a staging tray arranged adjacent to the input region of the main body and the guide;
   a media tray arranged in communication with the guide upstream from the staging tray; and
   a lamination tray having an exit portion adjacent the guide and downstream from the staging tray and the media tray.

15. The laminating device of claim 14, further comprising:
   a first heater arranged near an exit portion of the staging tray; and
   a second heater arranged near the exit portion of the lamination tray.

16. The laminating device of claim 14, wherein the holder comprises a pressure plate arranged inside the holder to align content media with a feed shaft arranged near the input region of the main body and leading to the staging tray.

17. The laminating device of claim 16, further comprising a plurality of sensors configured to determine at least one of position and availability of the content media.

18. The laminating device of claim 14, wherein:
   the holder holds photographs and the staging tray facilitates transportation of the photographs from the holder to the guide,
   the lamination tray holds laminate paper;
   the media tray holds album pages; and
   the photographs, laminate paper, and album pages are merged together downstream from the staging tray, the media tray and the lamination tray.

19. The laminating device of claim 18, further comprising at least one heater near the merge to heat laminate on the laminate paper in order to combine the photographs, laminate paper, and album pages together.

20. The laminating device of claim 14, wherein the actuating rail providing linear motion to the holder places photographs along different positions on the staging tray which facilitates transportation of the photographs onto different locations onto an album page.

21. The laminating device of claim 14, further comprising:
   feeding mechanisms adjacent an input region and exit region of the staging tray, adjacent the lamination tray and the guide; and a pressing unit for pressing together media exiting from the staging tray and support media exiting from media tray prior to an exit of the lamination tray.

22. A laminating device, comprising:

a main body having an input region and an exit region;

a holder to provide at least one content media mountable on the main body, the holder having a holder exit region in communication with the input region of the main body to permit media content to leave the holder and enter the main body;

a support media tray to provide at least one support media;

a guide arrange in a flow path from the support media tray exit port to the exit region, wherein the guide assists in guiding the support media from the support media tray to the exit region along the flow path;

a staging tray arranged at the input region of the main body and having a staging exit region, the staging tray receiving the content media and creating a path for the content media from the input region to a location on the guide downstream from the support media tray exit port, whereby at least one content media from the staging tray is combine with a support media; and a lamination tray to provide at least one laminate and having a lamination exit portion, the lamination tray arranged such that the lamination exit portion is at a location on the guide and downstream from the staging exit region of the staging tray whereby the laminate is laminated to the combined at least one content media and the support media; and at least one heater positioned downstream the staging tray, the lamination tray and the support media tray to provide heat to the laminate exiting from the lamination tray for combination with the at least one content media and the support media; and wherein the laminated combined at least one laminate, content media, and support media is transported to the exit region of the main body.

23. The laminating device of claim 22, wherein the at least one heater is a first heater arranged near an exit portion of the staging tray and a second heater arranged near an exit portion of the lamination tray.

24. The laminating device of claim 22, wherein the holder comprises a pressure plate arranged inside the holder to align photographs with a feed shaft arranged near the input region of the main body and leading to the staging tray.

25. The laminating device of claim 24, further comprising a plurality of sensors configured to transmit information concerning at least one of positions and availability of the content media, laminate and support media.

26. The laminating device of claim 22, wherein:

the holder holds photographs and the staging tray facilitates transportation of the photographs from the holder to the guide, the lamination tray holds laminate paper;

the support media tray holds album pages; and the photographs, laminate paper, and album pages are merged downstream from the staging tray, the media tray and the lamination tray and heated by the at least one heater.

27. The laminating device of claim 22, wherein an actuating rail providing linear motion to the holder places the photographs along different positions on the staging tray which facilitates transportation of the photographs onto different locations onto the album pages.

28. The laminating device of claim 22, further comprising:

feeding mechanisms adjacent an input and output of the staging tray, adjacent the lamination tray and the guide; and a pressing unit for pressing together content media exiting from the staging tray and support media exiting from media tray prior to an exit of the lamination tray.

* * * * *